United States Patent

[11] 3,608,081

[72] Inventors Raymond Curry Erickson
Metuchen;
Gennaro John Miraglia, East Brunswick, both of N.J.
[21] Appl. No. 877,479
[22] Filed Nov. 17, 1969
[45] Patented Sept. 21, 1971
[73] Assignee E. R. Squibb & Sons, Inc.
New York, N.Y.

[54] METHOD OF TREATING PSEUDOMONAS INFECTIONS
5 Claims, No Drawings
[52] U.S. Cl. .................................................. 424/271
[51] Int. Cl. .................................................. A61k 21/00
[50] Field of Search ........................................ 424/271

[56] References Cited
OTHER REFERENCES
Derwent Farmdoc #20,089, Neth. 6,509,544, pages 257–263, Published 1-31-66.
The Merck Veterinary Manual, 3rd edition, Merck and Co., Inc., 1967, pages 873 and 874

*Primary Examiner*—Jerome D. Goldberg
*Attorneys*—Lawrence S. Levinson, Merle J. Smith, Theodore J. Criares and Donald J. Perrella

ABSTRACT: A particularly effective method of treating infections caused by Pseudomonas organisms is by treatment with 6-($\alpha$-ureidophenyacetamido) penicillanic acid or a salt or lower alkyl ester thereof.

3,608,081

METHOD OF TREATING PSEUDOMONAS INFECTIONS

BACKGROUND AND BRIEF DESCRIPTION OF THE INVENTION

Pseudomonas is a genus of saprophytic bacteria which are characterized by the production of a green, blue or yellowish-green water-soluble pigment. Pseudomonas aeruginosa, perhaps the best known species, is the organism which produced blue pus and is found in intestinal discharges, suppurating wounds and infected sinuses. Pseudomonas caviae is an organism pathogenic for guinea pigs. Pseudomonas septica is a species found in a disease of caterpillars.

Antibiotics of the penicillin series which have relatively broad spectra, benzyl penicillin or ampicillin, for example, are not particularly effective against infections caused by Pseudomonas organisms. It has now been found that hard-to-manage infections is warmblooded animals caused by Pseudomonas organisms, especially Pseudomonas aeruginosa respond to treatment with a composition comprising 6-($\alpha$-ureidophenylacetamido)penicillanic acid or a salt or lower alkyl ester thereof.

DETAILED DESCRIPTION OF THE INVENTION

General systemic bacterial infections are caused by microorganisms of the genus Pseudomonas, e.g., Pseudomonas aeruginosa, Pseudomonas psuedomallei, Pseudomonas caviae, especially the first. They are frequently associated with burns, urinary tract infections and the use of immunosuppressant agents. Such infections respond to treatment with a composition comprising 6-($\alpha$-ureidophenylacetamido)penicillanic acid or a salt thereof.

The 6-($\alpha$-ureidophenylacetamido)pencillanic acid compound is produced by first reacting 6-aminopenicillanic acid (6-APA) or a salt or ester thereof with phenyl glycine or salt or ester thereof. Preferably the amino group is protected during the reaction. The salt may be in the form of an alkali metal salt, such as sodium or potassium. Lower alkyl esters, preferably the methyl ester, may be used. The product of the foregoing reaction is treated with a cyanate, e.g., an alkali metal cyanate such as potassium cyanate, or with carbamyl phosphate. Alternatively the phenyl glycine or its salt or ester may be treated with the cyanate or carbamyl phosphate prior to the reaction with 6-APA.

Certain of the compounds described exist in various states of solvation as well as in different optically active forms. The various forms as well as mixtures may be used. The product derived from D-phenyl glycine is usually most effective.

The penicillanic acid compounds for the purposes of this invention, are prepared in compositions for parenteral administration, i.e., intravenously, intramuscularly or subcutaneously, preferably intramuscularly. From 250 to about 4,000 mg. administered parenterally on a daily basis in single or two to four divided doses are used to treat infections caused by species of the organism Pseudomonas, e.g., urinary infections. In particularly severe systemic infections up to about 6 grams per day, intravenously, may be used. Preferred is a daily dosage in the range of 250 to 1,000 mg. Up to about 500 mg. of the active compound in the form of the free acid or physiologically acceptable salt thereof (including hydrated forms) are incorporated in an injectable dosage form for use as a sterile aqueous solution or suspension prepared according to accepted pharmaceutical practice including stabilizers, preservatives, buffers and the like as required and as illustrated in the examples. This composition is administered to the animal host suffering from the Pseudomonas infection as indicated previously, at least until symptoms of the infection have subsided or disappeared. By way of example, in a general systemic bacteremia in mice due to Pseudomonas aeruginosa, the $PD_{50}$ is 234 mg./kg. administered in two divided doses on day of infection.

PREPARATION OF THE COMPOUND

EXAMPLE 1

To 420 ml. of distilled water are added 56.5 g. of 6[D(-)phenylacetamido]penicillanic acid trihydrate, followed by 11.3 g. of potassium cyanate. While stirring, the mixture is heated to 80° C. in 4.5 minutes. The clear solution which results is cooled in 5 minutes to 20° C. After holding overnight at room temperature the product is precipitated by adjusting the pH to 2.0 with 27 ml. of one-half concentrated hydrochloric acid. The crystalline mixture is agitated for one-half hour, filtered and the cake is washed with 200 ml. of cold distilled water. On drying to constant weight in vacuo at 30° C., white 6-[D(-)-$\alpha$-ureidophenylacetamido]penicillanic acid is obtained, m.p. 174°–176° (dec.).

The sodium salt is obtained by adding an equivalent amount of aqueous 0.1 N sodium hydroxide to a solution of the crude free acid in 95 percent ethanol and evaporating the solution to precipitate the purified salt. The potassium salt is similarly obtained using potassium hydroxide.

The DL- and L- forms are similarly obtained from the DL- and L- forms of the starting material, respectively.

PREPARATION OF COMPOSITIONS

EXAMPLE 2

A sterile powder for reconstitution for use intramuscularly is prepared from the following ingredients which supply 1,000 vials each containing 250 mg. of active ingredients:

| | |
|---|---|
| 6-[D-$\alpha$-ureidophenylacetamido]penicillanic acid monohydrate, sterile | 250 g. |
| Lecithin powder, sterile | 50 g. |
| Sodium carboxymethylcellulose, sterile | 20 g. |

The sterile powders are aseptically blended and filled into sterile vials and sealed. The addition of 1 ml. of water for injection to the vial provides a suspension for intramuscular injection.

EXAMPLE 3

A preformed suspension is prepared from the following ingredients which supply 1,000 vials each containing 300 mg. of active ingredient in 1 ml. of water for intramuscular injection

| | | |
|---|---|---|
| 6-[D-$\alpha$-ureidophenylacetamido]penicillanic acid, sterile | | 300 g. |
| Lecithin, sterile | | 60 g. |
| Sodium carboxymethylcellulose, sterile | | 10 g. |
| Acetate buffer, sterile | pH 4.5 | |
| Methyl paraben, sterile | | 1.2 g. |
| Propyl paraben, sterile | | 0.2 g. |
| Water for injection | qs. | 1 liter |

The parabens are dissolved in the acetate buffer and mixed with the water for injection. The lecithin and sodium carboxymethylcellulose are added and dissolved. The active compound is then added with stirring to make a homogenous suspension. The suspension is filled into sterile vials each containing 1 ml., sealed and stored under refrigeration.

EXAMPLE 4

The dry sodium slat for reconstitution as a solution for intramuscular or intravenous use is prepared from the following ingredients:

| | |
|---|---|
| 6-[D-$\alpha$-ureidophenylacetamido]penicillanic acid, sterile | 100 g. |
| Methylene chloride | 500 ml. |
| Triethylamine | 100 ml. |

The penicillin is dissolved in the methylene chloride with the aid of the triethylamine. The solution is sterile filtered and to the filtrate are added under aseptic conditions with continued stirring 500 ml. of sodium ethyl hexanoate, sterile solution 1 N. The sterile sodium salt of the penicillin compound crystallizes. The crystals are collected and air dried. The sterile crystals are filled into sterile vials in an amount of 500 mg. per vial and sealed. For use for intravenous or intramuscular injection 1.5 ml. of water for injection are added to the vial to dissolve the crystals just prior to use.

What we claim is:

1. A process for the treatment of Pseudomonas aeruginosa infections which comprises administering to an infected warm blooded animal daily a composition comprising an effective amount of about 250 to 4,000 mg. of 6-($\alpha$-ureidophenylacetamido)penicillanic acid or a salt thereof in a physiologically acceptable vehicle therefor.

2. A process as in claim 1 wherein the composition comprises about 250 to 1,000 mg. of the free acid.

3. A process as in claim 1 wherein the composition comprises about 250 to 1,000 mg. of the sodium salt.

4. A process as in claim 1 wherein the composition comprises an aqueous suspension containing about 250 to 500 mg. of the free acid.

5. A process as in claim 1 wherein the composition comprises an aqueous solution containing about 250 to 500 mg. of the sodium salt.